US006823224B2

(12) United States Patent
Wood et al.

(10) Patent No.: US 6,823,224 B2
(45) Date of Patent: Nov. 23, 2004

(54) DATA PROCESSING SYSTEM HAVING AN ON-CHIP BACKGROUND DEBUG SYSTEM AND METHOD THEREFOR

(75) Inventors: Michael C. Wood, Pflugerville, TX (US); George E. Baker, Austin, TX (US); James M. Sibigtroth, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 446 days.

(21) Appl. No.: 09/788,816

(22) Filed: Feb. 21, 2001

(65) Prior Publication Data

US 2002/0116081 A1 Aug. 22, 2002

(51) Int. Cl.$^7$ .......................... H02H 3/05; H03K 19/003
(52) U.S. Cl. ............................. 700/87; 714/30; 714/38; 717/124
(58) Field of Search .......................... 700/87; 703/28; 709/248, 400; 713/322; 714/30, 38; 717/124; 370/503, 514; 375/364

(56) References Cited

U.S. PATENT DOCUMENTS

| | | | |
|---|---|---|---|
| 3,781,803 A | * 12/1973 | Shear et al. ................. 375/356 |
| 5,361,392 A | 11/1994 | Fourscroy et al. | |
| 5,434,804 A | 7/1995 | Bock et al. | |
| 5,677,849 A | 10/1997 | Smith | |
| 5,838,692 A | * 11/1998 | Tobin ......................... 714/724 |
| 6,151,487 A | * 11/2000 | Kim et al. .................... 455/134 |
| 6,154,856 A | * 11/2000 | Madduri et al. ............... 714/27 |
| 6,173,386 B1 | * 1/2001 | Key et al. ...................... 712/10 |
| 6,173,409 B1 | * 1/2001 | Watts, Jr. et al. ............ 713/322 |
| 6,389,557 B1 | * 5/2002 | Yu et al. ........................ 714/34 |
| 6,442,725 B1 | * 8/2002 | Schipke et al. ............. 714/741 |
| 6,463,551 B1 | * 10/2002 | Kanzaki et al. ................ 714/30 |
| 6,473,449 B1 | * 10/2002 | Cafarella et al. ........... 375/141 |

FOREIGN PATENT DOCUMENTS

JP 09 198343 A 7/1997

OTHER PUBLICATIONS

Copy of related U.S. Patent Application SC11064$^{TH}$ entitled, "Data Processing System With On-Chip Fifo For Storing Debug Information and Method Therefor", (17 pgs.), filed on Feb. 16, 2001.

\* cited by examiner

*Primary Examiner*—Emanuel Todd Voeltz
(74) *Attorney, Agent, or Firm*—Joanna G. Chiu; Timothy E. Buckley

(57) ABSTRACT

Embodiments of the present invention relate to a mechanism to prevent the oscillator from being stopped when a host development system is coupled to the background debug communications interface and the background debug mode has been enabled. This allows background debugging operations to continue when the target data processing system is in a low power mode. Other embodiments relate to a mechanism for allowing a host development system to request a synchronization timing pulse from a target data processing system so the correct clock speed can be determined for background communications. Alternate embodiments relate to a data processing system having a system clock unit and a background debug system where the background debug system includes a background debug clock unit, separate from the system clock unit, and an enable control. When the enable control is asserted, the background debug clock unit is enabled, independent of the system clock unit.

23 Claims, 3 Drawing Sheets

DATA PROCESSING SYSTEM HAVING AN ON-CHIP BACKGROUND DEBUG SYSTEM AND METHOD THEREFOR

RELATED APPLICATION

This is related to United States Patent Application having docket number SC11064TH, entitled "DATA PROCESSING SYSTEM WITH ON-CHIP FIFO FOR STORING DEBUG INFORMATION AND METHOD THEREFOR," filed on even date herewith, and is incorporated herein by reference and assigned to the current assignee hereof.

FIELD OF THE INVENTION

The present invention relates generally to data processing systems, and more particularly, to data processing systems having on-chip background debug systems.

RELATED ART

In order to reduce power consumption, modem data processing systems often allow the application program to adjust the system clock speed or even stop the oscillator. In some cases, these actions require a host development system to adjust its communication speed to adapt to these changes within the target data processing system. In the cases where the target system oscillator is stopped, background communications are also stopped, thus preventing normal debugging operations such as reading or writing target system memory locations. Therefore, a need exists to allow normal debugging operations while the application program stops or adjusts the system clock speed. A need also exists for a host development system to determine the correct clock speed for background communications with the target data processing system.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as data, addresses, control, or status. The term "assert" is used when referring to the rendering of a signal, status bit, or similar apparatus into its logically true state. The term "negate" or "deassert" is used when referring to the rendering of a signal, status bit, or similar apparatus into its logically false state. If a signal (or status bit, etc.) is active high, the logically true state is a logic level one, and the logically false state is a logic level zero. If a signal (or status bit, etc.) is active low, the logically true state is a logic level zero, and the logically false state is a logic level one. Also, "high" may be used to refer to a logic level one while "low" may be used to refer to a logic level zero.

Figure 1:
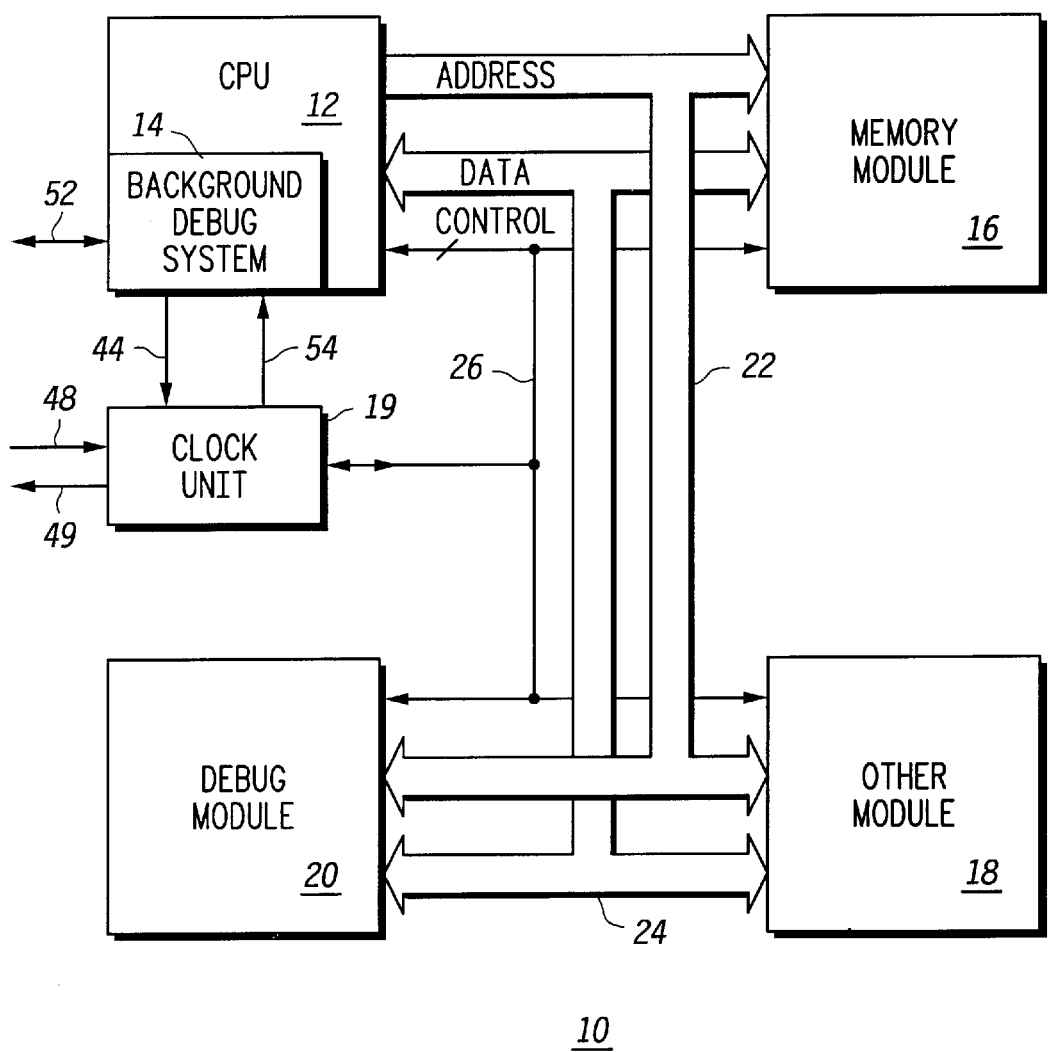
FIG. 1 illustrates, in block diagram form, a data processing system illustrating one embodiment of the present invention.

FIG. 1 illustrates, in block diagram form, a data processing system 10 in accordance with one embodiment of the present invention. Data processing system 10 can be any processing system such as a microcontroller, microprocessor, digital signal processor (DSP), or the like. Data processing system 10 includes CPU 12, clock unit 19, memory module 16, other module 18, debug module 20, internal address bus 22, internal data bus 24, and control signals 26. CPU 12 includes a background debug system (BDS) 14. BDS 14 includes a background communication interface 52. Internal data bus 24, internal address bus 22, and control signals 26 are coupled between CPU 12 and each of the peripheral modules on data processing system 10. Clock unit 19 is coupled to CPU 12 via control signals 26 and to BDS 14 via signals 44 and 54. Clock unit 19 also includes interface signals 48 and 49 for coupling to an oscillator circuit.

In operation, CPU 12 receives and executes instructions from a software program stored in memory module 16 via data bus 24. CPU 12 then directs or uses other resources of the data processing system to perform certain tasks. Memory module 16 may be any type of memory including, but not limited to, static random access memory, dynamic random access memory, or any type of non-volatile memory, such as for example, flash. Other module 18 may be another memory module, an analog-to-digital converter, a timer module, a serial communications module, for example, a CAN module, a general purpose input/output module, or the like. Debug module 20 may be any appropriate debug module that allows for program debugging.

Clock unit 19 is coupled to background debug system 14 via EN_BDM 44 and background debug clock 54. Signals 48 and 49 provide interface signals to external oscillator components. Clock unit 19 also receives and provides control signals via control signals 26. For example, clock unit 19 provides clock signals to CPU 12 and receives a STOP signal via control signals 26. Clock unit 19 also provides system clocks to CPU 12, memory module 16, debug module 20, and other module 18. (Clock unit 19 will be discussed further in reference to FIG. 2 below.) BDS 14 also includes background communication interface 52 which allows a host development system to be coupled to data processing system 10 (which may also be referred to as the target system). The host development system can therefore perform debug operations via background communication interface 52. In one embodiment, background communication interface 52 may be an asynchronous bi-directional single-wire interface. In this embodiment, BDS 14 needs only one external pin for performing debug operations with the host system. In alternate embodiments, other appropriate communication interfaces may be used, such as a JTAG interface.

Figure 2:
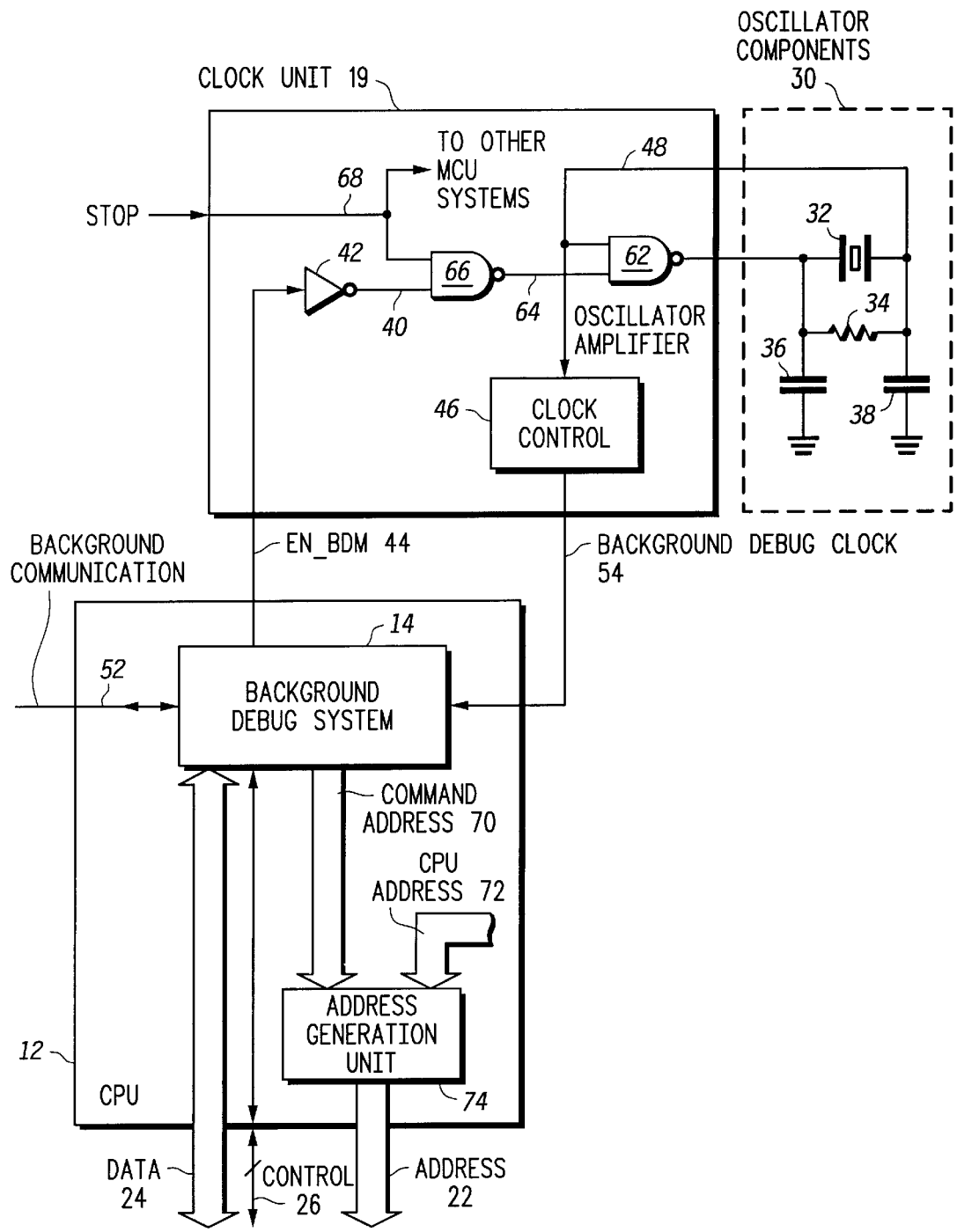
FIG. 2 illustrates, in partial block diagram and partial schematic form, a portion of the clock unit and central processing unit of FIG. 1 in accordance with one embodiment of the present invention.

FIG. 2 illustrates a portion of clock unit 19 and CPU 12 of FIG. 1, and external oscillator components 30. In one embodiment, external oscillator components 30 include a crystal or resonator 32, a feedback resistor 34, and two load capacitors 36 and 38, all coupled in a conventional Pierce oscillator configuration. However, alternate embodiments may use other appropriate oscillator components and configurations. Clock unit 19 includes inverter 42, NAND gates 66 and 62, and clock control 46. NAND gate 66 is coupled to STOP signal 68, inverter 42, and NAND gate 62. NAND gate 62 (also referred to as oscillator amplifier 62) is coupled to oscillator components 30 and clock control 46. Inverter 42 receives EN_BDM 44 from BDS 14 and clock control 46 provides background debug clock 54 to BDS 14. CPU 12 includes BDS 14 coupled to address generation unit 74 via command address 70. Address generation unit 74 also receives CPU address 72 and provides system addresses via address bus 22. BDS 14 is also bidirectionally coupled to background communication interface 52, data bus 24, and control signals 26.

In operation, oscillator amplifier 62 in clock unit 19 can be disabled by deasserting an active high enable signal 64. In prior art systems, the oscillator amplifier would be disabled (thus disabling the oscillator) upon the data processing system entering stop mode in order to reduce power consumption. However, in the embodiment of FIG. 2, enable signal 64 is driven by the output of NAND gate 66. The two inputs to NAND gate 66 are the STOP signal 68 and a stop enable control signal 40. Note that in this embodiment, both signals 68 and 40 are active high signals. Also note that STOP signal 68 may be generated by a CPU instruction to place data processing system 10 into stop mode (or a low power mode) to reduce power. During normal operation, typically no host system is coupled to background communication interface 52 and EN_BDM 44 is low (that is, BDS 14 is not enabled). Thus, the stop enable control signal 40 at the input of NAND gate 66 is high. Therefore, during normal operation, STOP signal 68 determines whether the oscillator will run or stop, depending on whether STOP signal 68 is low or high, respectively. Also, during normal operations, address generation unit 74 passes information from CPU address 72 onto address bus 22. For example, CPU address 72 may receive addresses from an execution unit (not shown) within CPU 12.

However, during development and debug operations, a host system is generally coupled to background communication interface 52 and EN_BDM 44 is high. This enables BDS 14 and drives the input to inverter 42 such that the stop enable control signal 40 is low. This forces the output of NAND gate 66 high, regardless of the state of STOP signal 68. This therefore allows BDS 14 to enable oscillator amplifier 62 independent of STOP signal 68. Note that STOP signal 68 also drives other circuits within data processing system 10 so that during debug operations, when BDS 14 forces the oscillator to remain running, other system clocks may still be stopped. BDS 14 also uses data bus 24, control signals 26, and address bus 22 to perform background debug operations, such as, for example, reading from and writing to memory. During such debug operations, address generation unit 74 passes addresses from BDS 14 on command address 70 to address bus 22 to allow BDS 14 access to the data processing system memories.

Therefore, it can be appreciated that, according to various embodiments of the present invention, when a host development system is coupled to a background communication interface and the background debug mode is enabled, the normal action of an oscillator stop mode is overridden such that the oscillator continues to run. This allows the background debug communications interface to continue to operate so normal debug operations can still be performed while other data processing system modules are shut down to save power. For example, when background debug mode is enabled, the host development system may send a READ_STATUS command to determine the status of the target system while the remainder of the data processing system modules remain shut down.

Referring again to FIG. 2, clock control 46 receives a reference oscillator signal 48 from oscillator components 30 and provides background debug clock 54 to BDS 14 based on reference signal 48. Clock control 46 may include circuitry, such as dividers, to adjust the reference oscillator signal. Therefore, a host development system knowing only the frequency of the oscillator reference signal and not the specifics of clock control 46 may not be able to determine the actual frequency of the system clocks generated by clock control 46. BDS 14 therefore has to address this problem in order to properly perform its debug operations with a host system, as will be discussed in reference to FIGS. 3 and 4.

Figure 3:
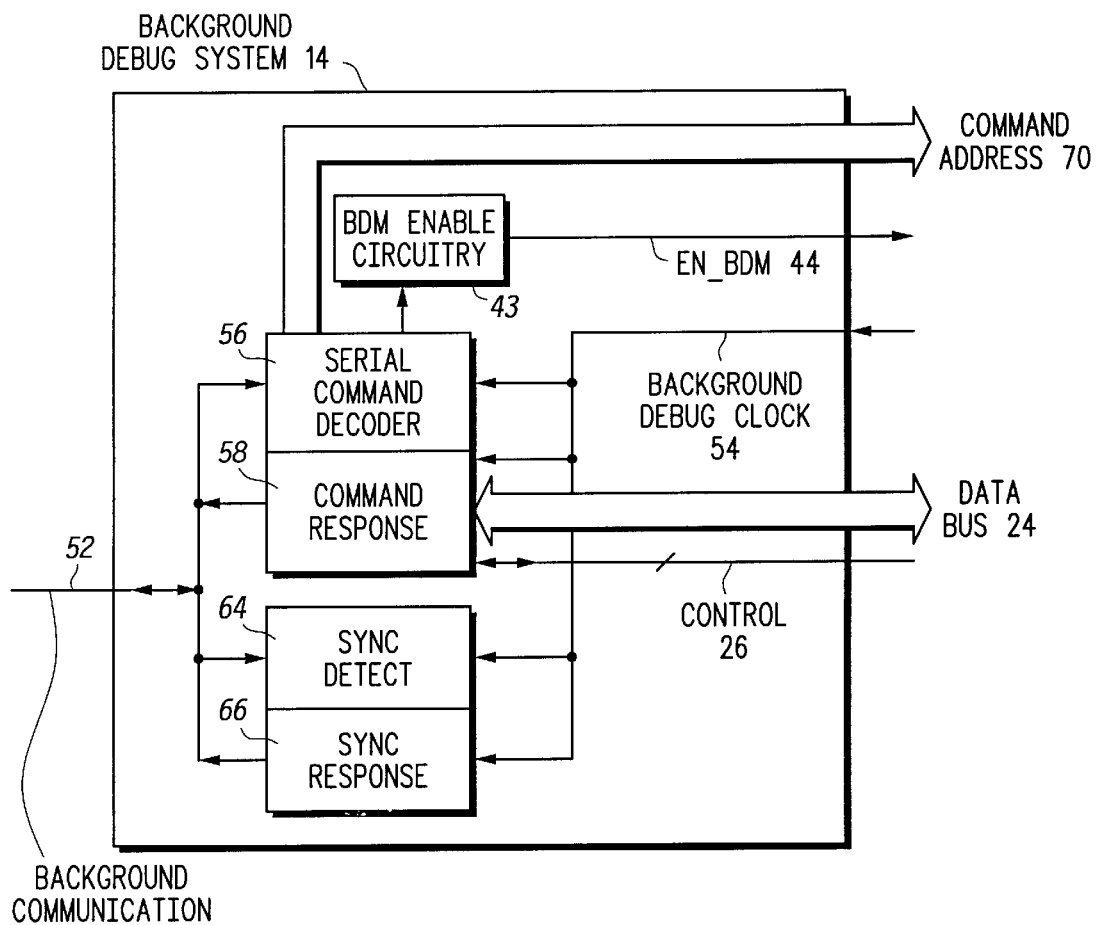
FIG. 3 illustrates, in block diagram form, the background debug system of FIG. 1 in accordance with one embodiment of the present invention.

FIG. 3 illustrates one embodiment of BDS 14. Background communication interface 52, which receives signals from an external host development system (i.e. an external debug host system), is coupled to serial command decoder block 56, command response block 58, synchronization (sync) detect block 64, and synchronization (sync) response block 66. Background debug clock signal 54 controls the timing of operations in serial command decoder block 56, command response block 58, sync detect block 64, and sync response block 66. Command response block 58 is also coupled to data bus 24 and control signals 26 to allow serial background commands to read or write memory and register values or to initiate debug commands such as GO, TRACE, or enter-active-BACKGROUND. Serial command decoder 56 is also coupled to BDM enable circuitry 43 which provides EN_BDM 44.

BDM enable circuitry 43 may include a control register for storing EN_BDM 44 as one of its control bits or may include other circuitry designed to assert EN_BDM 44. In one embodiment, EN_BDM 44 may be a bit stored in a control register that is only accessible by a BDS command issued by a host development system via background communication interface 52. This prevents user code from being able to purposely or inadvertently assert EN_BDM 44 and engage the STOP signal 68 override. In alternate embodiments, EN_BDM 44 may not be stored as a control bit and may instead be asserted by logic circuitry that detects when valid debug communications are taking place via background communication interface 52. Alternate embodiments may use different mechanisms and circuitries, other than those described in reference to BDM enable circuitry 43, for asserting EN_BDM 44 to enable BDS 14.

During background debug operations, serial commands and data are received via background communication interface 52 and decoded by serial command decoder 56. Command response block 58 then performs the requested command using signals in data bus 24 and control signals 26. For some commands, data is written to data processing system 10 via data bus 24 and control signals 26. For other commands, data is read from data processing system 10 via data bus 24 and control signals 26 and sent back to the host development system as a serial data stream over background communication interface 52. In one embodiment, according to a predetermined communication protocol, all commands and data processed by serial command decoder 56 and command response block 58 conform to the symbol timing shown in FIG. 4. In this example protocol, the line coupling a host development system to background communication interface 52 is not asserted low for more than approximately three-fourths of a symbol duration which, in this embodiment, is 16 cycles of the background debug clock 54. (Note that in the description below, background communication interface 52 may also refer to the communication line coupled to background communication interface 52 from the host development system. That is, when coupled to a host development system, background communication interface 52 may also be referred to as background communication line 52.)

Figure 4:
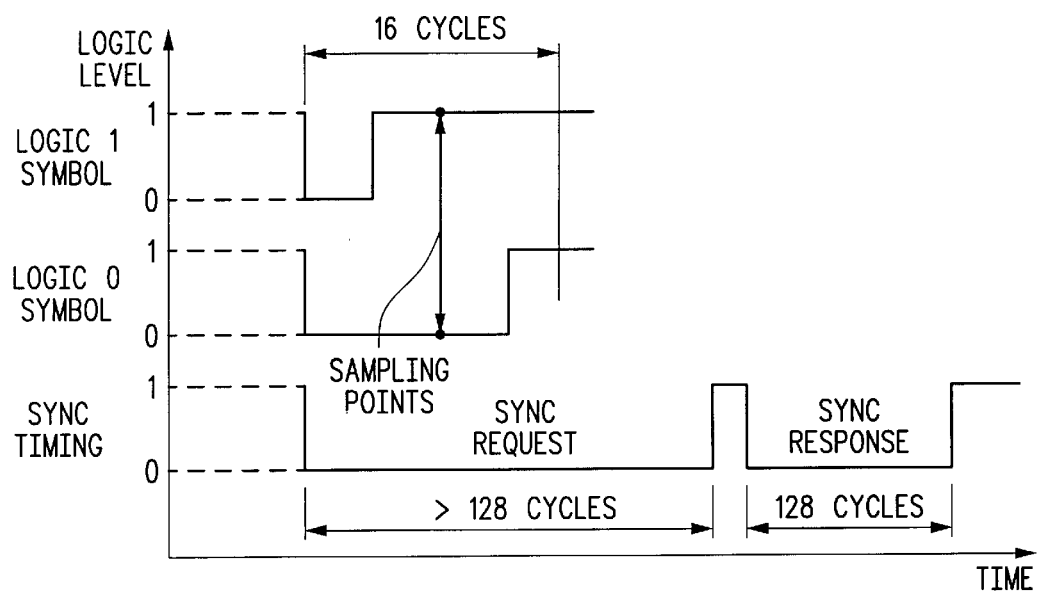
FIG. 4 illustrates, in timing diagram form, a logic one symbol, a logic zero symbol, and a synchronization request and response, in accordance with one embodiment of the present invention.

FIG. 4 shows the timing for a logic 1 symbol duration (i.e. bit time) and a logic 0 symbol duration (i.e. bit time) for normal serial commands and data on background communication line 52. In this embodiment, each symbol begins with a falling edge and is 16 cycles of background debug clock 54. The logic value for each bit time is sampled near the middle of the bit time, as illustrated in FIG. 4 by the label "SAMPLING POINTS." In the case of a logic 1 symbol, the signal is asserted low for about one-fourth of the bit time so that it is a logic 1 when sampled in the middle of the bit time. Alternatively, the signal can be asserted low for any amount of time so long as it is deasserted prior to the sampling point in order for the signal to give the correct value (logic 1) when sampled. Similarly, in the case of a logic 0 symbol, the signal is asserted low for about three-fourths of the bit time so that it is at a logic zero when sampled in the middle of the bit time. Alternatively, the signal can be asserted low for any amount of time so long as it is asserted low at the sampling point in order for the signal to give the correct value (logic 0) when sampled and deasserted before the start of a new symbol. That is, for a logic 0 symbol, the signal can remain asserted low beyond the duration of the current symbol before being deasserted at some time prior to the start of the next symbol. In this embodiment, at no time during normal debug communications is background communication line 52 asserted low for longer than for the logic zero case.

FIG. 4 also illustrates the timing for a synchronization (sync) request and a synchronization (sync) response, using the example protocol described above. A sync request is initiated when an external host development system asserts background communication line 52 low for at least 128 cycles of the background debug clock 54. When the sync detect block 64 in data processing system 10 (i.e. the target system) detects this sync request, it waits until background communication line 52 returns to the deasserted high level. The sync response block 66 then delays for a few cycles of the background debug clock 54 (sufficient for background communication line 52 to at least return to a high state which provides a clear break between the request and response), and then asserts background communication line 52 for 128 cycles of the background debug clock 54. The external host development system is then able to measure the duration of this low sync response signal to determine the correct speed for subsequent background communications.

As discussed above, an external host development system may be unable to detect the correct processor speed for performing debug operations. Therefore, the sync request and response mechanism allows a host development system to determine the correct clock speed for background communications with a target system. In summary, the host development system requests a synchronization timing pulse from the target system by asserting a background communication signal for much longer than it would be asserted for normal communications. Upon recognizing this request, the target system responds by asserting the background communication signal for a specific number of cycles of the communications clock signal. The host measures the length of this response pulse to determine the correct communication speed. The sync request and response can therefore be used to synchronize a first data processing system to a second data processing system, and is not limited to just host and target systems.

Alternate embodiments may communicate according to other communication protocols which may define symbols as having a different duration and format. For example, a symbol may have a duration of more or less than the 16 cycles illustrated in FIG. 4 and may be sampled at a different point during the symbol duration. Therefore, a sync request may be more or less than the 128 cycles illustrated above. Generally, the sync request is substantially longer than the maximum symbol duration. For example, in the embodiment of FIG. 4, the 128 cycle is at least longer than the 16 cycles (corresponding to a normal symbol duration) and allows for sufficient tolerance in the clock signals and for any measurement errors. In some embodiments, the duration of the sync request may be defined to be at least twice the duration of a normal symbol. On the other hand, the sync response transmitted by the target system is of a fixed duration in order to allow the host system to make a proper time measurement using the fixed number of cycles transmitted. However, since the host may be asynchronous to the target system, there may be some uncertainty in the measurement of the sync response. Therefore, a long enough duration (as compared to the duration of a normal symbol) should be chosen for the sync response so as to minimize the effect of the measurement uncertainty and allow the host system to obtain more accurate timing information. Alternate embodiments, though, may utilize many different combinations for the durations of the sync request and sync response.

In an alternate embodiment of data processing system 10, BDS 14 may include a self-contained oscillator, such as a Resistor-Capacitor (RC) oscillator, or the like, which is independent of clock unit 19. In such a system, logic similar to that used to override STOP signal 68 may be used to appropriately enable the self-contained oscillator. For example, this self-contained oscillator can be enabled when valid communication is detected on background communication line 52, regardless of the operation of the system oscillator. Therefore, the system oscillator for the data processing system can be placed into stop mode, and BDS 14 may still continue to perform debug operations regardless. If a self-contained oscillator, such as an RC oscillator, is used by BDM 14, the host system generally does not have prior knowledge of its timing information. This is in part because RC oscillators generally have wide frequency tolerances, thus making it difficult to know the frequency. However, as discussed above, the host system may utilize the sync request in order to obtain the proper timing information from BDM 14 through the sync response.

Although the invention has been described with respect to specific conductivity types or polarity of potentials, skilled artisans appreciated that conductivity types and polarities of potentials may be reversed. For example, signals designed as active high may be designed as active low, and those designed as active low may be designed as active high. One of ordinary skill in the art would understand how to modify the circuitry to accommodate such changes.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A data processing system comprising:
    a background debug system having an enable control; and
    a clock unit, coupled to the background debug system and adapted to receive the enable control, the clock unit capable of stopping oscillation;
    wherein when the enable control is asserted, the clock unit is prevented from stopping oscillation.

2. The data processing system of claim 1, wherein the background debug system includes a control register for storing a bit corresponding to the enable control.

3. The data processing system of claim 2, wherein the data processing system further comprises a communication interface, coupled to the background debug system, the communication interface capable of transferring commands to the background debug system.

4. The data processing system of claim 3, wherein the bit corresponding to the enable control can only be written by a command received via the communication interface.

5. The data processing system of claim 3, wherein the enable control is asserted if valid communication is detected via the communication interface.

6. A method of operating a data processing system having a background debug system coupled to a clock unit, comprising:
    entering a low power mode, wherein during the low power mode, the clock unit is capable of stopping oscillation;
    asserting a background debug enable control; and
    in response to asserting the background debug enable control, the background debug system preventing the clock unit from stopping oscillation.

7. The method of claim 6, wherein the enable control corresponds to a control bit within the background debug system.

8. The method of claim 6, wherein:
    the background debug system comprises a background communication interface, and
    asserting the background enable control is performed in response to detecting valid communication via the background communication interface.

9. The method of claim 6, wherein the low power mode comprises a stop mode.

10. A data processing system, comprising:
    a communication interface capable of transferring symbols having at predetermined symbol duration according to a predetermined communication protocol;
    a synchronization detect unit coupled to the communication interface and adapted to receive a synchronization request, wherein the synchronization request has a duration longer than the symbol duration; and
    a synchronization response unit, coupled to the communication interface and adapted to provide a synchronization response to the synchronization request wherein the synchronization response is provided by the data processing system to a host unit, the host unit capable of determining the predetermined symbol duration from the synchronization response.

11. The data processing system of claim 10, wherein:
    the synchronization request is provided by the host unit, wherein the host unit is external to the data processing system.

12. The data processing system of claim 10, wherein the communication interface comprises a serial, asynchronous, bidirectional communication interface.

13. A data processing system, comprising:
    an asynchronous communication interface, capable of communicating with a host unit external to the data processing system at a background debug speed; and
    a background debug system, coupled to the asynchronous communication interface, the background debug system comprising:
        a synchronization detect unit adapted to receive a synchronization request from the host unit, and
        a synchronization response unit adapted to provide a synchronization response to the host unit in response to the synchronization request, wherein the synchronization response is used to determine the background debug speed.

14. The data processing system of claim 13, wherein the asynchronous communication interface comprises a serial, bidirectional communication interface.

15. The data processing system of claim 14, wherein the asynchronous communication interface comprises a single wire.

16. The data processing system of claim 13, wherein:
    the asynchronous communication interface is capable communicating bits having a predetermined bit time at the background debug speed in accordance with a communication protocol, and
    the host unit asserts the synchronization request for a duration longer than the the predetermined bit time.

17. The data processing system of claim 16, wherein the duration of the synchronization request is at least longer than twice the predetermined bit time.

18. A method of synchronizing a first data processing system to a second data processing system, the first and second data processing systems communicating according to a communication protocol for transferring symbols having a predetermined symbol duration relative to a clock speed of the second data processing system, comprising:
    providing a synchronization request from the first data processing system having a duration longer than the predetermined symbol duration; and
    in response to the synchronization request, the second data processing system providing a synchronization response having a fixed predetermined duration, wherein the first data processing system determines the predetermined symbol duration from the synchronization response.

19. The method of claim 18, wherein the duration of the synchronization request is at least twice the predetermined symbol duration.

20. A data processing system comprising:
    a background debug system having a background debug clock unit and an enable control coupled to the background debug clock unit; and
    a system clock unit, coupled to the background debug system, the system clock unit adapted to be coupled to a system oscillator and capable of stopping oscillation of the system oscillator;

wherein when the enable control is asserted, the background debug clock unit is enabled.

21. The data processing system of claims 20, wherein the background debug clock unit comprises a background debug oscillator, separate from the system oscillator.

22. The data processing system of claim 21, wherein when the enable control is asserted, the background debug oscillator is enabled independent of the system oscillator.

23. A method of operating a data processing system having a background debug system coupled to a system clock unit, the background debug system having a background debug clock unit, comprising:

- entering a low power mode, wherein during the low power mode, the system clock unit prevents oscillation for the data processing system;
- asserting a background debug enable control; and
- in response to asserting the background debug enable control, enabling oscillation of the background debug clock unit, independent of the system clock unit.

* * * * *